Patented July 21, 1931

1,815,816

UNITED STATES PATENT OFFICE

HANS WESCHE AND KARL BRODERSEN, OF DESSAU IN ANHALT, AND WERNER EXT, OF KIEL-KRONSHAGEN, GERMANY, ASSIGNORS TO WINTHROP CHEMICAL COMPANY, INC., OF NEW YORK. N. Y., A CORPORATION OF NEW YORK

INSECTICIDE

No Drawing. Application filed May 31, 1928, Serial No. 282,038, and in Germany August 9, 1926.

In our application filed on the same day we have described new insecticides containing monothiocyanates of the aromatic series.

Our present invention is based upon the discovery that organic polythiocyanates, the derivatives and substitution products of these thiocyanates are also extraordinarily active insecticides. These polythiocyanates may be derived from the aliphatic or from the aromatic series; individual insecticides according to this invention are, for example, ethylene dithiocyanate, styroldithiocyanate, dithiocyanodiphenylamine and so on.

As compared with the aliphatic monosulfocyanides which are easily volatil and, in consequence of their unbearable pungent smell, cannot come into practical consideration, the comparatively difficultly volatil polythiocyanates defined above have the advantage that they are effective for a relatively long period and are not excluded from use by their odor.

The activity of these insecticides exceeds considerably that of insecticides hitherto known. They do not damage plants; they may be applied in any desired manner, for example, by scattering in conjunction with the usual diluents, by fumigation or by spraying in the form of a solution or emulsion.

The following example illustrates the invention:

Example.—A mixture of 5 parts of ethylenedithiocyanate and 95 parts of talc are mixed to form a dusting agent. This suffices to kill in a very short time the larvæ and imagines of Piesma quadrata, which hitherto has not been possible with any synthetic agent.

The same action is obtained by use of other organic polythiocyanates, for example, styroldithiocyanate, dithiocyanodiphenylamine.

By spraying a solution or an emulsion of the polythiocyanates of the organic series the same effect is obtained; the solutions or emulsions may be in a very dilute state. The effective polythiocyanates may be used in a mixture with other known insecticides.

What we claim is:

1. As an insecticide a preparation containing as an active constituent an organic polythiocyanate.

2. As an insecticide a preparation containing as an active constituent an organic polythiocyanate of the aliphatic series.

3. As an insecticide a preparation containing ethylene dithiocyanate.

4. As an insecticide a preparation containing 5 per cent of ethylene dithiocyanate and 95 per cent of talc powder.

5. As an insecticide a preparation containing as an active constituent an organic polythiocyanate of the aromatic series.

6. As an insecticide a preparation containing as an active constituent dithiocyano diphenylamine.

In testimony whereof, we affix our signatures.

HANS WESCHE.
KARL BRODERSEN.
WERNER EXT.